(12) United States Patent
Sokuza

(10) Patent No.: US 11,298,995 B2
(45) Date of Patent: Apr. 12, 2022

(54) AUTOMATED GUIDED VEHICLE

(71) Applicant: NIDEC-SHIMPO CORPORATION, Kyoto (JP)

(72) Inventor: Masashi Sokuza, Kyoto (JP)

(73) Assignee: NIDEC-SHIMPO CORPORATION, Kyoto (JP)

( * ) Notice: Subject to any disclaimer, the term of this patent is extended or adjusted under 35 U.S.C. 154(b) by 415 days.

(21) Appl. No.: 16/362,685

(22) Filed: Mar. 24, 2019

(65) Prior Publication Data
US 2019/0299729 A1  Oct. 3, 2019

(30) Foreign Application Priority Data

Mar. 30, 2018 (JP) .............................. JP2018-069713

(51) Int. Cl.
| | |
|---|---|
| *B60D 1/36* | (2006.01) |
| *B60D 1/52* | (2006.01) |
| *B60D 1/62* | (2006.01) |
| *B60D 1/48* | (2006.01) |
| *B60D 1/58* | (2006.01) |
| *B60D 1/02* | (2006.01) |
| *B61G 1/28* | (2006.01) |
| *B60D 1/26* | (2006.01) |
| *B60D 1/24* | (2006.01) |
| *B60D 1/00* | (2006.01) |

(52) U.S. Cl.
CPC ................ *B60D 1/36* (2013.01); *B60D 1/02* (2013.01); *B60D 1/24* (2013.01); *B60D 1/26* (2013.01); *B60D 1/481* (2013.01); *B60D 1/52* (2013.01); *B60D 1/583* (2013.01); *B60D 1/62* (2013.01); *B61G 1/28* (2013.01); *B60D 2001/001* (2013.01); *B60D 2001/005* (2013.01)

(58) Field of Classification Search
CPC ....... B60D 1/36; B60D 1/52; B60D 2001/001
USPC .......................................................... 280/515
See application file for complete search history.

(56) References Cited

U.S. PATENT DOCUMENTS

| | | | | |
|---|---|---|---|---|
| 2,525,474 A | * | 10/1950 | Blumenthal ........... | C01G 25/06 423/517 |
| 2,705,649 A | * | 4/1955 | Collier .................... | B60D 1/26 280/504 |

(Continued)

FOREIGN PATENT DOCUMENTS

| | | |
|---|---|---|
| EP | 0149453 | 7/1985 |
| EP | 0315731 | 5/1989 |

(Continued)

*Primary Examiner* — Tony H Winner
(74) *Attorney, Agent, or Firm* — JCIPRNET

(57) ABSTRACT

In an automated guided vehicle, a connection mechanism includes a connecting part and a movable part, and is connected to an object by the connecting part. When the connecting part is in a first state and the movable part is at a first position, an end portion on the other side in a first direction of the connecting part contacts a surface on one side in the first direction of the movable part or penetrates the movable part in the first direction to protrude toward the other side in the first direction with respect to the surface on one side in the first direction of the movable part. When the connecting part is in the first state and the movable part is at a second position, the movable part is away from the connecting part. A force applied to the movable part maintains the movable part at the first position.

20 Claims, 7 Drawing Sheets

(56) References Cited

U.S. PATENT DOCUMENTS

| | | | | |
|---|---|---|---|---|
| 4,597,364 A | * | 7/1986 | Young | F02D 19/022 |
| | | | | 123/27 GE |
| 5,427,399 A | * | 6/1995 | Olson | A01B 59/042 |
| | | | | 280/508 |
| 2005/0184484 A1 | * | 8/2005 | Johns | B60D 1/02 |
| | | | | 280/515 |
| 2006/0249927 A1 | * | 11/2006 | Metternich | B60D 1/62 |
| | | | | 280/515 |
| 2009/0302575 A1 | * | 12/2009 | Archer | B60D 1/02 |
| | | | | 280/507 |
| 2011/0049840 A1 | * | 3/2011 | Shaw | B60D 1/02 |
| | | | | 280/515 |
| 2011/0316255 A1 | * | 12/2011 | Staples | B60P 3/1066 |
| | | | | 280/510 |
| 2013/0154236 A1 | * | 6/2013 | Shaw | B60D 1/28 |
| | | | | 280/515 |
| 2015/0211194 A1 | * | 7/2015 | Petersen | F16J 15/16 |
| | | | | 404/122 |
| 2019/0232738 A1 | * | 8/2019 | Furuno | B60D 1/04 |
| 2021/0017007 A1 | * | 1/2021 | Houston | B66F 9/063 |

FOREIGN PATENT DOCUMENTS

| | | |
|---|---|---|
| EP | 1743828 | 1/2007 |
| GB | 2429195 | 2/2007 |
| JP | 2005297809 | 10/2005 |
| WO | 2018021474 | 2/2018 |

\* cited by examiner

AUTOMATED GUIDED VEHICLE

CROSS-REFERENCE TO RELATED APPLICATION

This application claims the priority benefit of Japan Application No. 2018-069713, filed on Mar. 30, 2018. The entirety of the above-mentioned patent application is hereby incorporated by reference herein and made a part of this specification.

BACKGROUND

Technical Field

The disclosure relates to an automated guided vehicle.

Description of Related Art

An automated guided vehicle that moves an object is known. For example, Patent Document 1 describes a trailer towing vehicle that tows and moves a trailer as an automated guided vehicle. The trailer towing vehicle of Patent Document 1 has a connecting pin lifting mechanism that raises and lowers a connecting pin for connecting the trailer towing vehicle to a trailer.

When an automated guided vehicle as described above is used indoors, a position of an object to be moved by the automated guided vehicle is often determined to a certain extent. Therefore, the automated guided vehicle automatically can approach an object and connect the object to the automated guided vehicle using a connection mechanism. Thereby, the automated guided vehicle can automatically perform connection with an object, movement of the object, and release of the connection with the object.

On the other hand, for example, when an automated guided vehicle as described above is used outdoors, a position of an object to be moved is not particularly determined and differs on each occasion in many cases. In this case, an automated guided vehicle can automatically perform movement of an object and release of the connection with the object on the basis of a destination registered in the automated guided vehicle, but it has been difficult for the automated guided vehicle to automatically perform connection with the object.

In contrast, it is conceivable that an operator may manually connect an object to an automated guided vehicle. However, since a connected state and a released state of a connection mechanism of the automated guided vehicle are automatically controlled, the operator needs to connect an object to the automated guided vehicle while giving the automated guided vehicle an instruction to switch a state of the connection mechanism, and thus the procedure may be complicated.

PATENT DOCUMENTS

[Patent Document 1] Japanese Patent Laid-Open No. 2005-297809

SUMMARY

One aspect of an automated guided vehicle of the disclosure is an automated guided vehicle that moves an object having an annular connected part, and the automated guided vehicle includes a vehicle body, a drive wheel attached to the vehicle body, and a connection mechanism connected to the object via the connected part. The connection mechanism includes a base having a hole recessed toward one side in a first direction, a connecting part extending in the first direction and having at least a portion thereof disposed in the hole, a drive unit moving the connecting part in the first direction, a support part protruding from a position different from the hole on the base toward the other side in the first direction, and a movable part attached to be movable in a predetermined direction with respect to the support part, and is connected to the object when the connecting part is passed through an inside of the connected part. The drive unit is able to switch a state of the connecting part between a first state in which an end portion on the other side in the first direction of the connecting part protrudes from the hole toward the other side in the first direction and a second state in which the end portion on the other side in the first direction of the connecting part is positioned on one side in the first direction with respect to that in the first state. The movable part is movable between a first position and a second position different from the first position. When the connecting part is in the first state and the movable part is positioned at the first position, the end portion on the other side in the first direction of the connecting part comes into contact with a surface on one side in the first direction of the movable part or penetrates the movable part in the first direction to protrude toward the other side in the first direction with respect to the surface on one side in the first direction of the movable part. When the connecting part is in the first state and the movable part is positioned at the second position, the movable part is positioned at a position away from the connecting part in the predetermined direction. When the connecting part is in the second state, the connecting part and the movable part are disposed away from each other in the first direction. A force is applied to the movable part in a direction that causes a position of the movable part to be maintained at the first position.

DESCRIPTION OF THE EMBODIMENTS

One aspect of the disclosure has been made and provides an automated guided vehicle to which an operator can manually connect an object with ease and in which movement of the object and release of a connection with the object can be automatically performed.

According to one aspect of the disclosure, an operator can manually connect an object to the automated guided vehicle with ease and the automated guided vehicle can automatically perform movement of the object and release of the connection with the object.

A Z-axis direction appropriately illustrated in each drawing is a vertical direction. An X-axis direction and a Y-axis direction are horizontal directions perpendicular to the Z-axis direction and are perpendicular to each other. The X-axis direction in the present embodiment is a front-rear direction of an automated guided vehicle 10 of the present embodiment. The Y-axis direction in the present embodiment is a lateral direction of the automated guided vehicle 10 of the present embodiment.

In the following description, a direction parallel to the Z-axis direction is referred to as a "vertical direction Z," a positive side in the vertical direction Z is referred to as an "upper side," and a negative side in the vertical direction Z is referred to as a "lower side." A direction parallel to the X-axis direction is referred to as a "front-rear direction X," a positive side in the front-rear direction X is referred to as a "front side," and a negative side in the front-rear direction X is referred to as a "rear side." A direction parallel to the Y-axis direction is referred to as a "lateral direction Y."

Also, a central axis J appropriately illustrated in each drawing is a virtual line extending in the vertical direction Z. In the following description, a radial direction with respect to the central axis J is simply referred to as a "radial direction," and a circumferential direction around the central axis J is simply referred to as a "circumferential direction."

In the present embodiment, the vertical direction Z corresponds to a first direction, and the lateral direction Y corresponds to a second direction. Also, the lower side corresponds to one side in the first direction, and the upper side corresponds to the other side in the first direction. Further, the vertical direction, the horizontal direction, the front-rear direction, the lateral direction, the upper side, the lower side, the front side, and the rear side are simply names for describing relative positional relationships between the respective parts, and actual disposition relationships or the like may be disposition relationships or the like other than the disposition relationships or the like indicated by these names.

Figure 1:
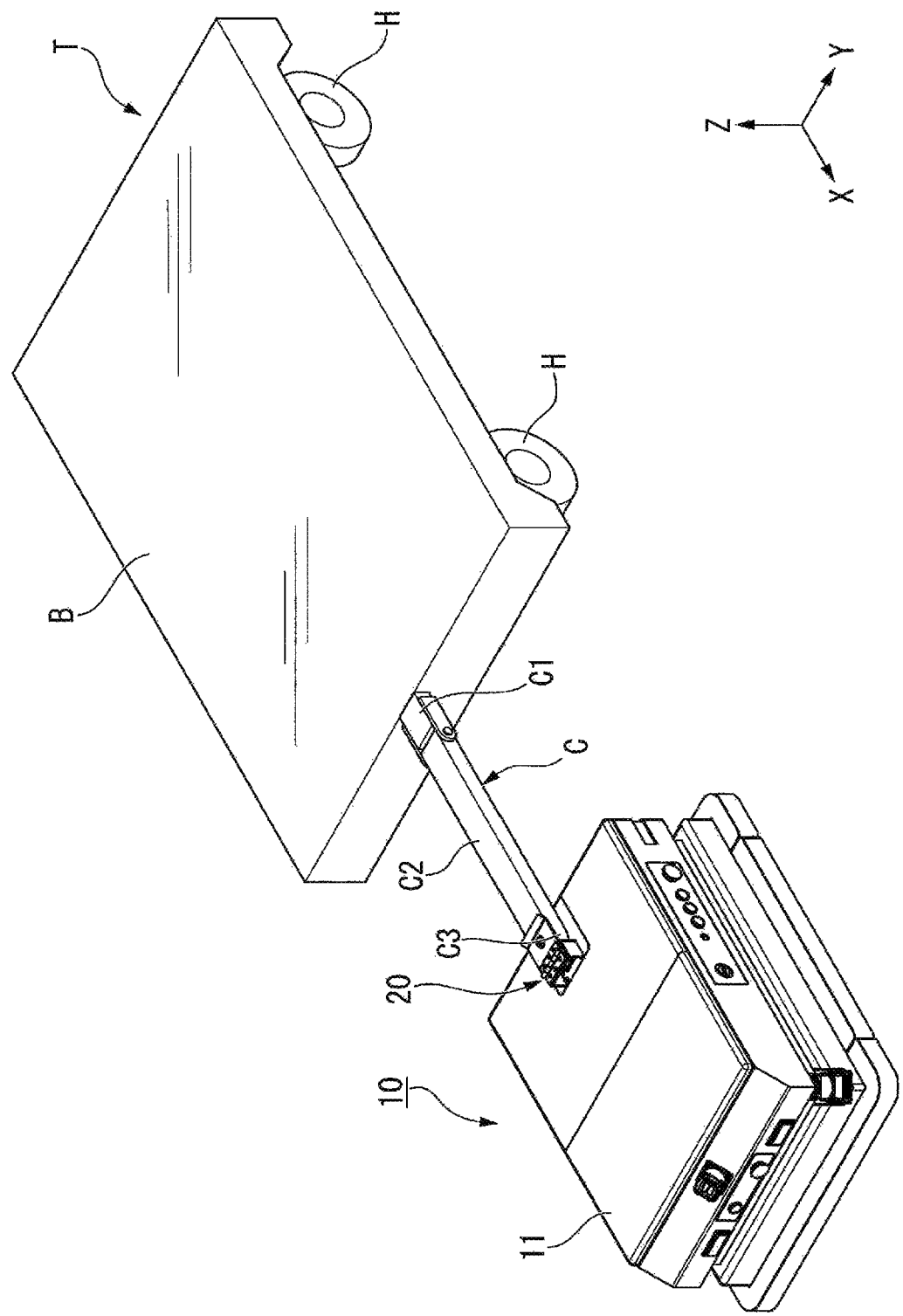
FIG. 1 is a perspective view illustrating an automated guided vehicle of the present embodiment.
Figure 2:
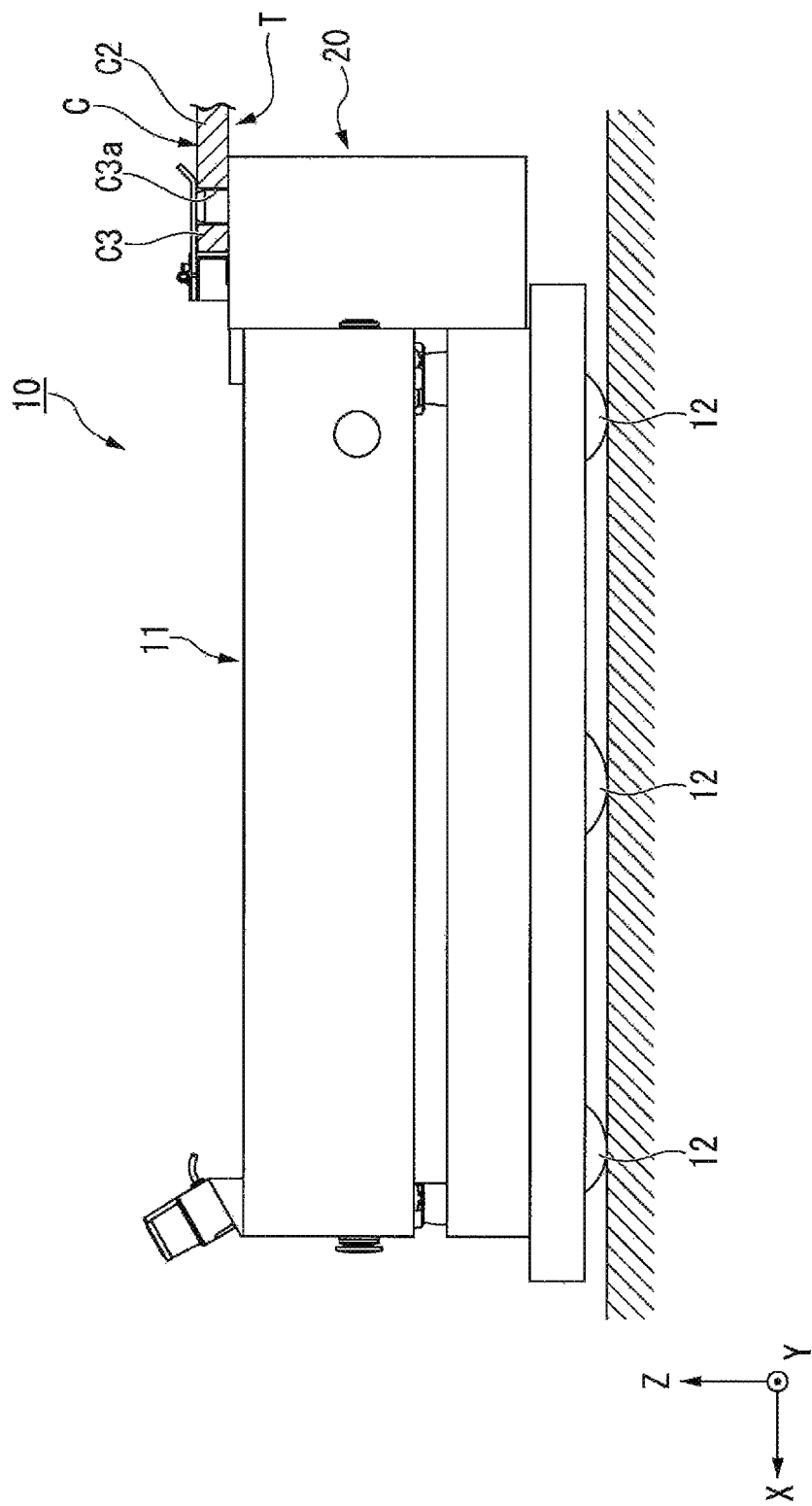
FIG. 2 is a view of the automated guided vehicle of the present embodiment in a lateral direction.

The automated guided vehicle 10 of the present embodiment illustrated in FIGS. 1 and 2 is, for example, an automated guided vehicle used outdoors. As illustrated in FIG. 1, the automated guided vehicle 10 of the present embodiment moves a trailer T as an object. The trailer T includes a trailer main body B, a plurality of wheels H, and a connecting bar C. The trailer main body B has a rectangular shape when viewed in the vertical direction Z. An upper surface of the trailer main body B is a flat surface perpendicular to the vertical direction Z. Loads carried by the trailer T are placed on the upper surface of the trailer main body B. The plurality of wheels H are attached to a lower side of the trailer main body B.

The connecting bar C has an elongated square column shape extending from the trailer main body B to the front side. The connecting bar C includes a first member C1 and a second member C2. The first member C1 is fixed to an end portion on the front side of the trailer main body B. The second member C2 is connected to an end portion on the front side of the first member C1 to be rotatable around an axis parallel to the lateral direction Y. As illustrated in FIG. 2, an end portion on the front side of the second member C2 is an annular connected part C3 having a connection hole C3a. That is, the trailer T includes the connected part C3.

The automated guided vehicle 10 includes a vehicle body 11, a drive wheel 12, and a connection mechanism 20. The vehicle body 11 has a substantially rectangular parallelepiped shape elongated in the front-rear direction X. The drive wheel 12 is attached to a lower side of the vehicle body 11. A plurality of drive wheels 12 are provided.

Figure 3:
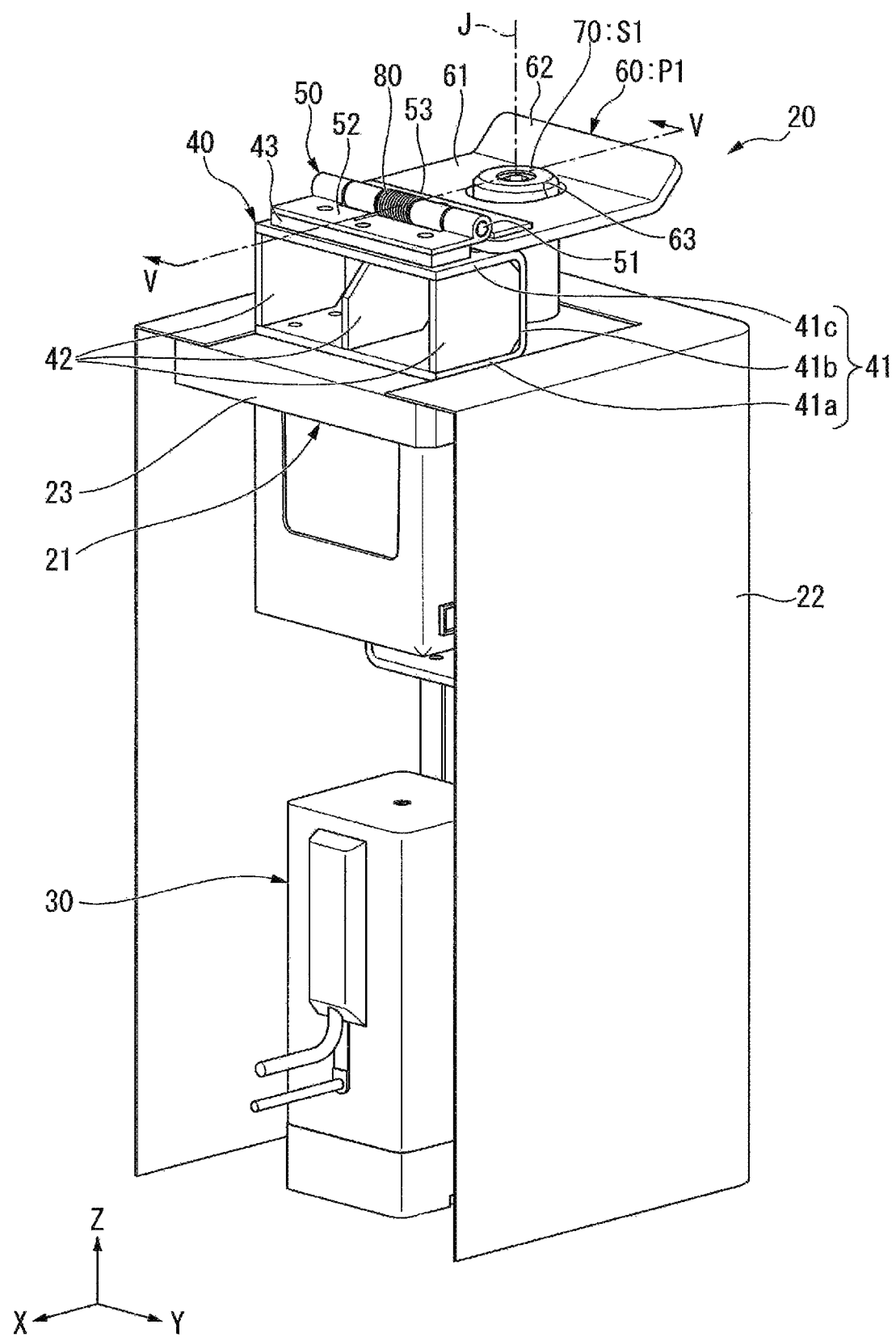
FIG. 3 is a perspective view illustrating a connection mechanism of the present embodiment.
Figure 4:
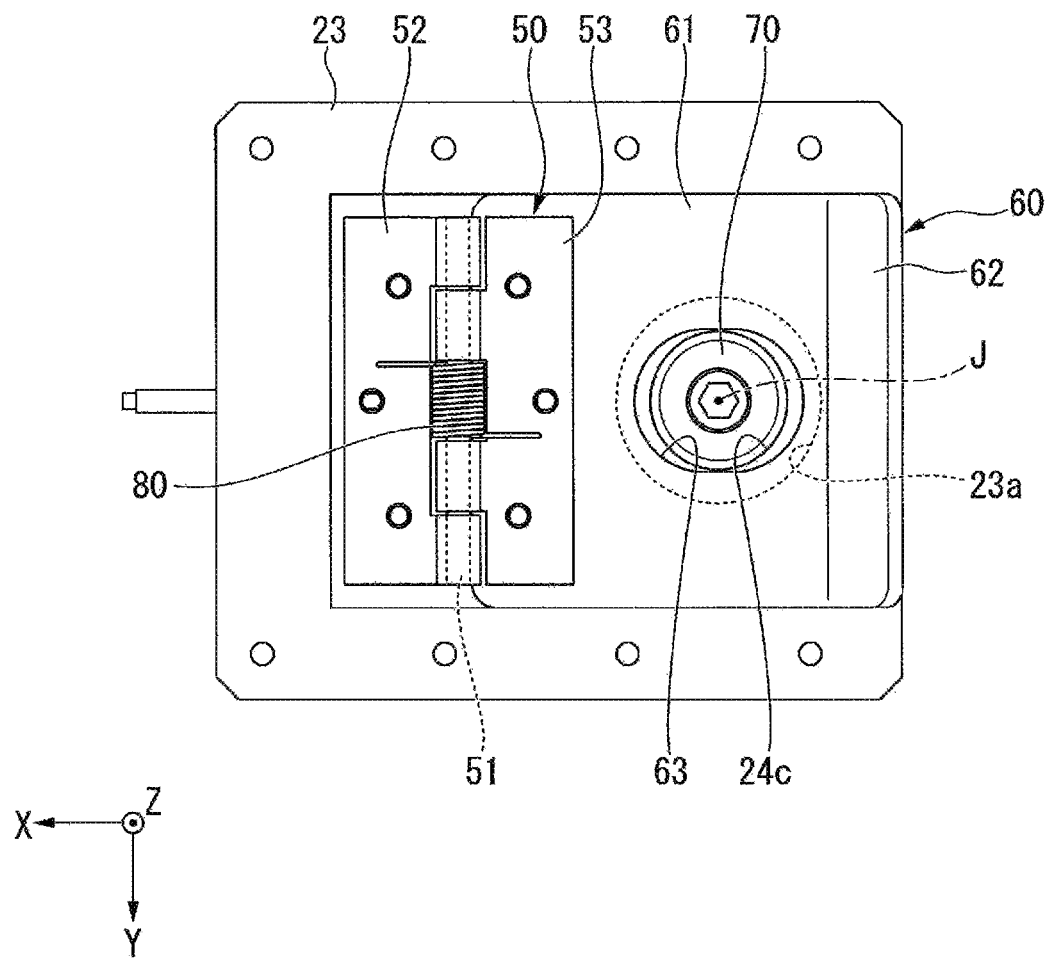
FIG. 4 is a view of a portion of the connection mechanism of the present embodiment from above.
Figure 5:
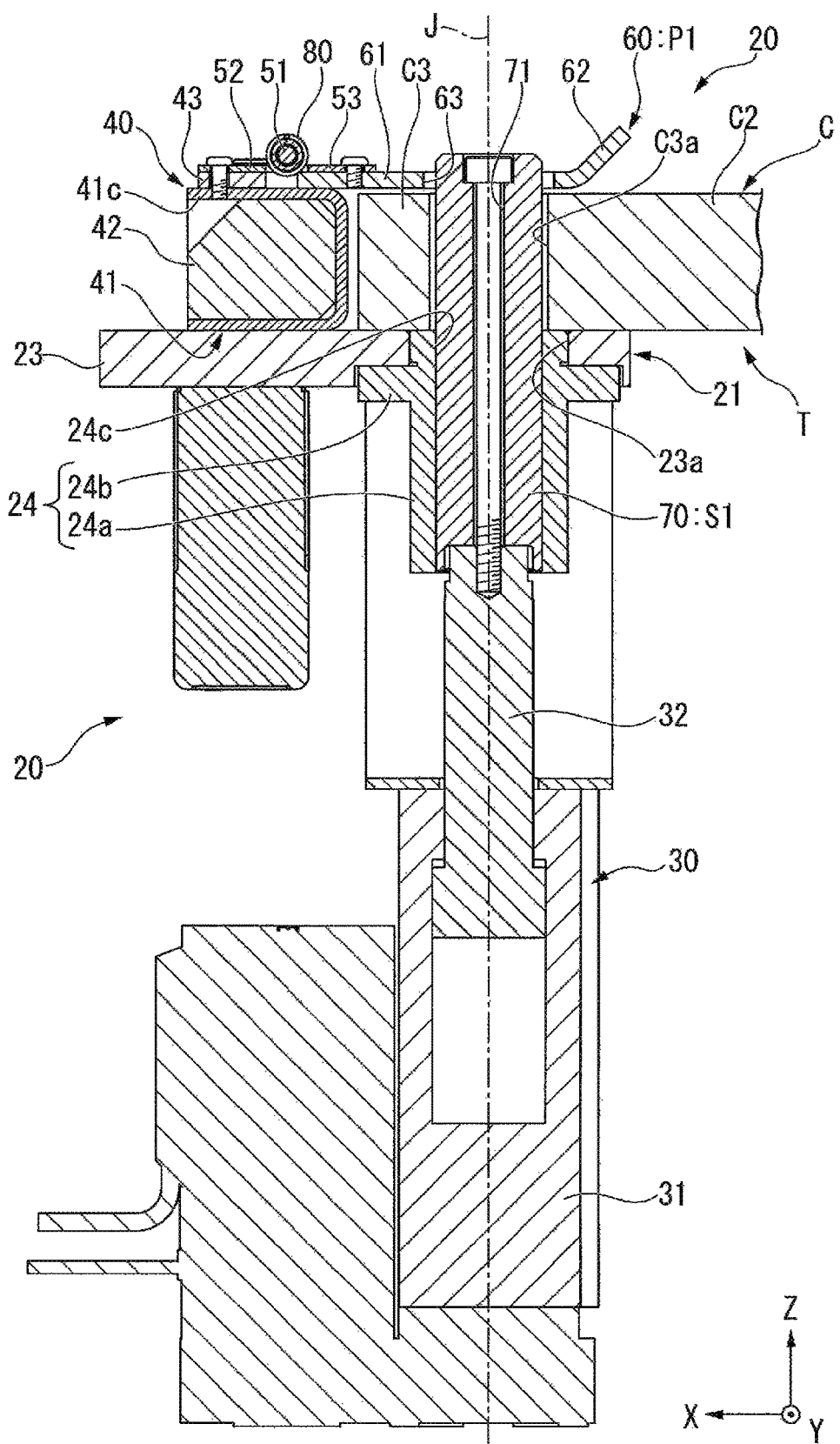
FIG. 5 is a cross-sectional view illustrating the connection mechanism of the present embodiment, taken along line V-V in FIG. 3.

In the present embodiment, the connection mechanism 20 is attached to an end portion on the rear side of the vehicle body 11. The connection mechanism 20 is connected to the trailer T via the connected part C3. As illustrated in FIGS. 3 to 5, the connection mechanism 20 includes a base 21, a cover 22, a drive unit 30, a connecting part 70, a support part 40, a hinge part 50, a movable part 60, and an elastic member 80.

The base 21 includes a base part 23 and a guide part 24. The base part 23 has a substantially rectangular plate shape in which a plate surface thereof faces in the vertical direction Z. As illustrated in FIG. 5, the base part 23 includes a penetration part 23a penetrating the base part 23 in the vertical direction Z. The guide part 24 is attached to the base part 23. The guide part 24 includes a cylindrical part 24a and a flange part 24b.

The cylindrical part 24a has a cylindrical shape extending in the vertical direction Z with the central axis J as a center. The cylindrical part 24a opens on both sides in the vertical direction. An end portion on an upper side of the cylindrical part 24a is fitted and fixed to the penetration part 23a from below. An end surface on the upper side of the cylindrical part 24a and a surface on an upper side of the base part 23 are positioned on the same plane perpendicular to the vertical direction Z and constitute a surface on an upper side of the base 21. An inner side of the cylindrical part 24a is a hole 24c recessed downward from the surface on the upper side of the base 21. That is, the base 21 includes the hole 24c recessed downward.

The flange portion 24b protrudes from an outer circumferential surface of the cylindrical part 24a toward a radial outer side. The flange part 24b has a plate shape in which a plate surface thereof faces in the vertical direction Z. Although not illustrated, the flange part 24b has an annular plate shape with the central axis J as a center. A surface on an upper side of the flange part 24b is in contact with and fixed to a surface on a lower side of the base part 23.

As illustrated in FIG. 3, the cover 22 is fixed to the base part 23. The cover 22 includes a plate-shaped portion extending downward from edge portions on both sides in the lateral direction of the base part 23 and a plate-shaped portion extending downward from an edge portion on a rear side of the base part 23. The cover 22 covers both sides in the lateral direction and the rear side of the drive unit 30.

The drive unit 30 is positioned on a lower side of the base 21. As illustrated in FIG. 5, the drive unit 30 includes a main body part 31 and a drive shaft 32. The main body part 31 has a cylindrical shape extending in the vertical direction Z with the central axis J as a center. The drive shaft 32 has a columnar shape extending in the vertical direction Z with the central axis J as a center. A portion on a lower side of the drive shaft 32 is fitted to a radial inner side of the main body part 31. An end portion on an upper side of the drive shaft 32 protrudes upward with respect to the main body part 31.

Figure 6:
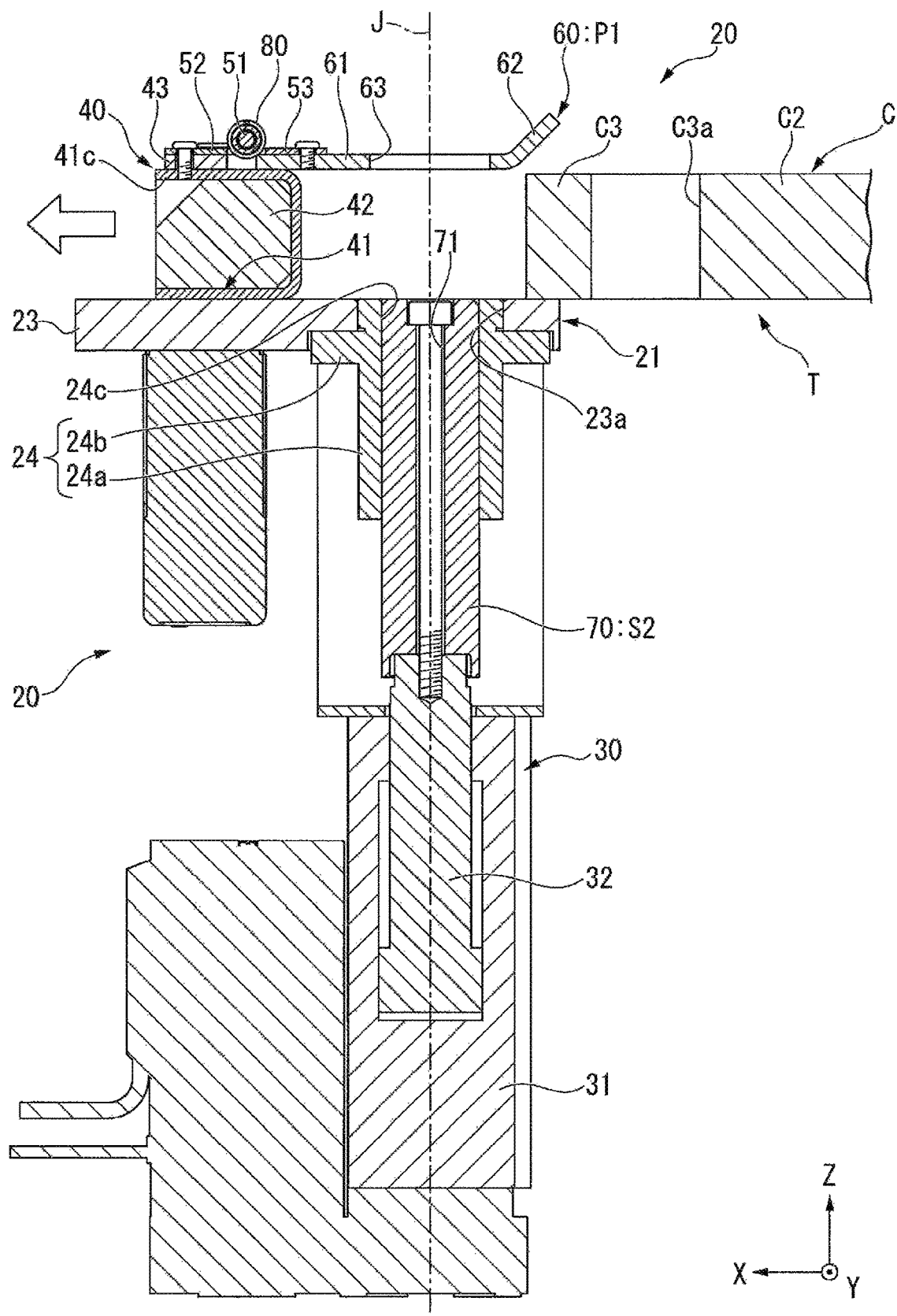
FIG. 6 is a cross-sectional view illustrating the connection mechanism of the present embodiment.

As illustrated in FIGS. 5 and 6, the drive shaft 32 moves in the vertical direction Z due to power supply to the drive unit 30. In the present embodiment, the drive unit 30 moves the drive shaft 32 in the vertical direction Z with, for example, a mechanism using a ball screw. The power supply to the drive unit 30 is performed, for example, from a power supply (not illustrated) of the automated guided vehicle 10 provided inside the vehicle body 11.

The connecting part 70 extends in the vertical direction Z. As illustrated in FIG. 3, the connecting part 70 in the present embodiment has a columnar shape with the central axis J as a center. As illustrated in FIG. 5, the connecting part 70 is fixed to the end portion on the upper side of the drive shaft 32. The connecting part 70 includes a fixing hole 71 penetrating the connecting part 70 in the vertical direction Z. In the present embodiment, the connecting part 70 is fixed to the drive shaft 32 by fastening a screw threaded through the fixing hole 71 from an upper side thereof to an end surface on the upper side of the drive shaft 32.

At least a portion of the connecting part 70 is disposed in the hole 24c. In FIG. 5, a portion on a lower side of the connecting part 70 is disposed in the hole 24c. In FIG. 6, a portion on an upper side of the connecting part 70 is disposed in the hole 24c. The connecting part 70 is supported to be movable in the vertical direction Z by an inner circumferential surface of the hole 24c. The connecting part 70 moves in the vertical direction Z according to movement of the drive shaft 32 in the vertical direction Z. That is, the drive unit 30 moves the connecting part 70 in the vertical direction Z.

More specifically, the drive unit 30 can switch a state of the connecting part 70 between a first state S1 and a second state S2. The first state S1 is a state of the connecting part 70 illustrated in FIG. 5. The first state S1 is a state in which the end portion on the upper side of the connecting part 70 protrudes upward from the hole 24c. The second state S2 is a state of the connecting part 70 illustrated in FIG. 6. The second state S2 is a state in which the end portion on the upper side of the connecting part 70 is positioned lower than in the first state S1. In the present embodiment, for example, a state of the connecting part 70 is the first state S1 except for a case in which a connection between the connection mechanism 20 and the trailer T is released.

As illustrated in FIG. 6, in the second state S2 of the present embodiment, the end portion on the upper side of the connecting part 70 is positioned at the same position as the surface on the upper side of the base 21. Thus, in the second state S2, the entire connecting part 70 is accommodated in the hole 24c. In the second state S2, an end surface on the upper side of the connecting part 70 and the surface on the upper side of the base 21 are positioned on the same plane perpendicular to the vertical direction Z. When the connecting part 70 is in the second state S2, the connecting part 70 and the movable part 60 are disposed away from each other in the vertical direction Z.

The support part 40 protrudes upward from a position different from the hole 24c in the base 21. In the present embodiment, the support part 40 is fixed to a portion on a front side with respect to the hole 24c on the surface on the upper side of the base part 23. As illustrated in FIG. 3, the support part 40 includes a support part main body 41, a plurality of support plate parts 42, and a spacer member 43. The support part main body 41 is a plate-shaped member bent in a U shape opening toward the front side when viewed in the lateral direction Y. The support part main body 41 includes a first plate part 41a, a second plate part 41b, and a third plate part 41c.

The first plate part 41a has a substantially rectangular plate shape in which a plate surface thereof faces in the vertical direction Z and is elongated in the lateral direction Y. The first plate part 41a is fixed to the surface on the upper side of the base part 23 by, for example, a screw or the like. The second plate part 41b extends upward from an end portion on a rear side of the first plate part 41a. The second plate part 41b has a substantially rectangular plate shape in which a plate surface thereof faces in the front-rear direction X and is elongated in the lateral direction Y. The third plate part 41c extends toward the front side from an end portion on an upper side of the second plate part 41b. The third plate part 41c has a substantially rectangular plate shape in which a plate surface thereof faces in the vertical direction Z and is elongated in the lateral direction Y.

The plurality of support plate parts 42 have a rectangular plate shape in which each plate surface thereof faces in the lateral direction Y. The plurality of support plate parts 42 are positioned between the first plate part 41a and the third plate part 41c in the vertical direction Z. End portions on both sides in the vertical direction of the support plate parts 42 are in contact with and fixed to the first plate part 41a and the third plate part 41c. End portions on a rear side of the support plate parts 42 are in contact with and fixed to the second plate part 41b. The plurality of support plate parts 42 are disposed at intervals in the lateral direction Y. The spacer member 43 has a rectangular plate shape in which a plate surface thereof faces in the vertical direction Z and is elongated in the lateral direction Y. The spacer member 43 is fixed to a portion on a front side on an upper surface of the third plate part 41c.

The hinge part 50 is fixed to an upper side of the support part 40. As illustrated in FIG. 4, the hinge part 50 includes a rotating shaft 51, a fixed plate 52, and a movable plate 53. The rotating shaft 51 extends in the lateral direction Y perpendicular to the vertical direction Z. The fixed plate 52 and the movable plate 53 are connected with the rotating shaft 51. The fixed plate 52 has a rectangular plate shape in which a plate surface thereof faces in the vertical direction Z and is elongated in the lateral direction Y. As illustrated in FIG. 5, the fixed plate 52 is fixed to an upper surface of the spacer member 43 using screws. The screws fixing the fixed plate 52 penetrate the fixed plate 52 and the spacer member 43 in the vertical direction Z and are fastened to the third plate part 41c. Thereby, both the fixed plate 52 and the spacer member 43 are fixed to the support part main body 41.

As illustrated in FIG. 4, the movable plate 53 has a rectangular plate shape elongated in the lateral direction Y. The movable plate 53 is rotatable around the rotating shaft 51 with respect to the fixed plate 52. As illustrated in FIG. 5, the movable plate 53 is fixed to the movable part 60 with screws.

The movable part 60 is a plate-shaped member in which a plate surface thereof extends in the lateral direction Y. A plate thickness of the movable part 60 may be, for example, the same as a plate thickness of the spacer member 43. In the present embodiment, the movable part 60 is attached to the support part 40 via the hinge part 50. Thereby, the movable part 60 is attached to be movable in a rotational direction around the rotating shaft 51 with respect to the support part 40. In the present embodiment, the rotational direction around the rotating shaft 51 corresponds to a predetermined direction.

As illustrated in FIG. 3, the movable part 60 includes a movable part main body 61 and a bent part 62. The movable part main body 61 extends to a rear side from the hinge part 50. As illustrated in FIG. 5, the movable plate 53 is fixed to an upper surface at an end portion on a front side of the movable part main body 61 with screws. Thereby, the movable part 60 is fixed to the hinge part 50.

The movable part main body 61 includes a through hole 63 penetrating the movable part 60 in the vertical direction Z. That is, the movable part 60 includes the through hole 63. As illustrated in FIG. 4, the through hole 63 has an oval shape elongated in the front-rear direction X.

The bent part 62 is connected to an end portion on a rear side of the movable part main body 61. As illustrated in FIG.

5, the bent part 62 is a portion bent upward. The bent part 62 is an end portion on a rear side of the movable part 60. That is, an end portion of the movable part 60 on a side opposite to the support part 40 is the bent part 62 bent upward. In a posture illustrated in FIG. 5, the bent part 62 extends obliquely toward an upper position from the movable part main body 61 toward the rear side.

In the present embodiment, the movable part 60 is movable between a first position P1 and a second position P2 different from the first position P1. The first position P1 is a position of the movable part 60 illustrated in FIGS. 1 to 6. The second position P2 is a position of the movable part 60 illustrated in FIG. 7.

As illustrated in FIGS. 3 to 6, the first position P1 is a position of the movable part 60 having a posture in which the plate surface of the movable part main body 61 is perpendicular to the vertical direction Z and the movable part main body 61 extends in a straight line from the support part 40 to the rear side. In the first position P1, the end portion on the front side of the movable part main body 61 is in contact with the upper surface of the third plate part 41c. In the first position P1, the end portion on the rear side of the movable part main body 61 is positioned on a rear side with respect to the connecting part 70. In the first position P1, the through hole 63 overlaps the connecting part 70 when viewed in the vertical direction Z.

As illustrated in FIG. 5, when the connecting part 70 is in the first state S1 and the movable part 60 is positioned at the first position P1, the end portion on the upper side of the connecting part 70 penetrates the movable part 60 in the vertical direction Z and protrudes upward with respect to a lower surface of the movable part 60. In the present embodiment, when the connecting part 70 is in the first state S1 and the movable part 60 is positioned at the first position P1, the end portion on the upper side of the connecting part 70 protrudes upward with respect to the movable part 60 via the through hole 63.

Figure 7:
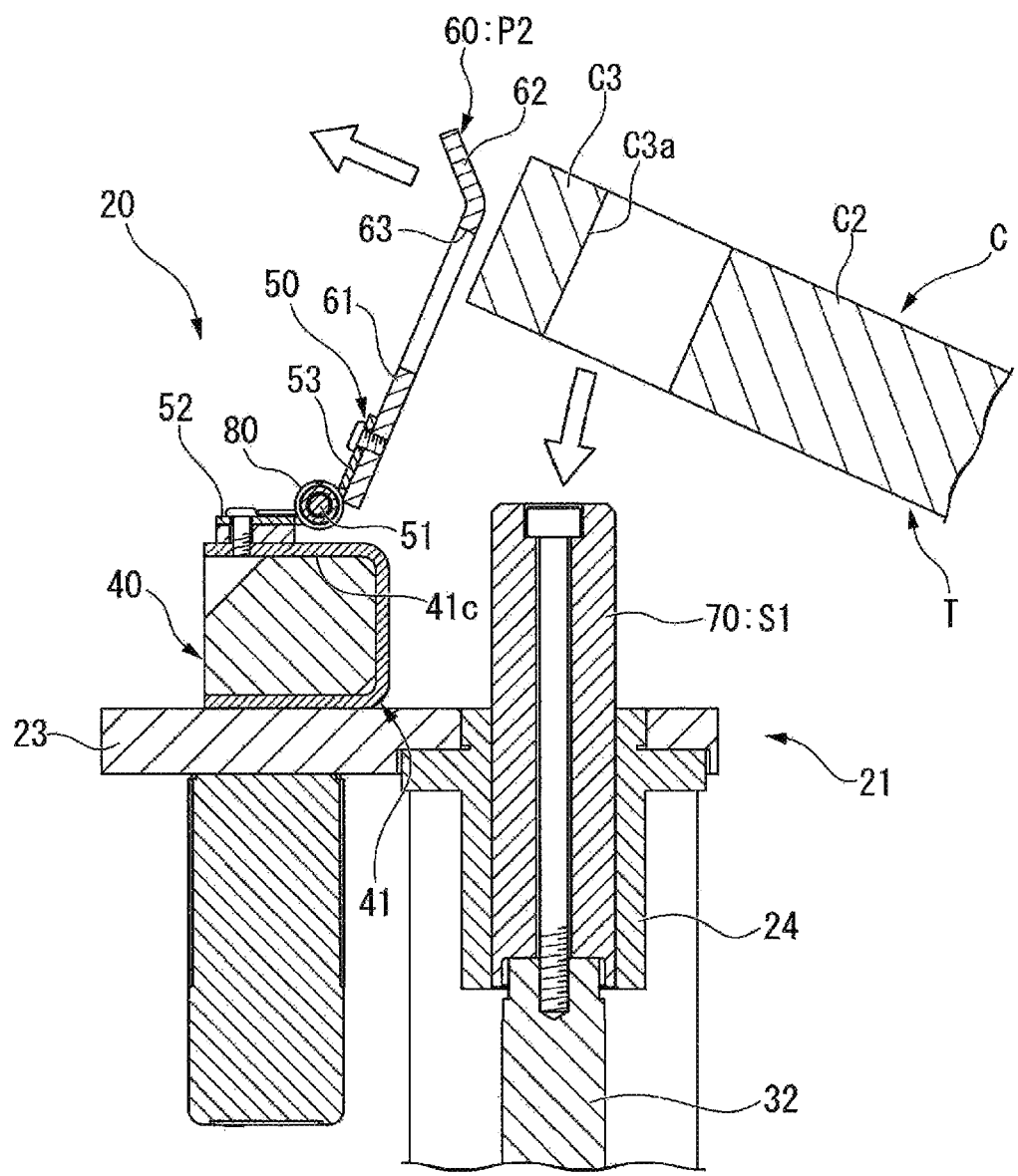
FIG. 7 is a cross-sectional view illustrating a portion of the connection mechanism of the present embodiment.

As illustrated in FIG. 7, the second position P2 is a position at which the movable part 60 has rotated around the rotating shaft 51 from the first position P1. More specifically, the second position P2 is a position at which the movable part 60 has rotated around the rotating shaft 51 in a counterclockwise direction with respect to the first position P1 when viewed from a positive side in the lateral direction Y. At the second position P2, the movable part 60 is positioned above and in front of the first position P1. At the second position P2, the end portion on the front side of the movable part main body 61 is separated upward from the third plate part 41c. At the second position P2, the movable part 60 is positioned on a front side with respect to the connecting part 70. At the second position P2, the movable part 60 is positioned at a position away from the connecting part 70 in a rotational direction around the rotating shaft 51. That is, when the connecting part 70 is in the first state S1 and the movable part 60 is positioned at the second position P2, the movable part 60 is positioned at a position away from the connecting part 70 in the rotational direction around the rotating shaft 51.

The elastic member 80 is attached to the hinge part 50. As illustrated in FIG. 4, the elastic member 80 in the present embodiment is a coil spring extending in the lateral direction Y. The elastic member 80 is attached to the rotating shaft 51. The elastic member 80 applies an elastic force around the rotating shaft 51 in a direction in which the movable plate 53 and the movable part main body 61 are pressed against an upper surface of the support part main body 41. Thereby, the elastic member 80 applies an elastic force to the movable part 60 from the second position P2 toward the first position P1 in the rotational direction of the rotating shaft 51. Accordingly, in a state in which no external force is applied to the movable part 60, a position of the movable part 60 is maintained at the first position P1. That is, a force is applied to the movable part 60 in a direction that causes the position of the movable part 60 to be maintained at the first position P1.

As illustrated in FIG. 7, an operator connecting the trailer T to the automated guided vehicle 10 manually rotates the movable part 60 around the rotating shaft 51 first to move the movable part 60 from the first position P1 to the second position P2. At this time, a state of the connecting part 70 is the first state S1.

Next, the operator brings the connecting bar C of the trailer T closer to the connecting part 70 from above and passes the connecting part 70 through the connection hole C3a of the connected part C3 as illustrated in FIG. 5. Thereafter, the operator returns a position of the movable part 60 from the second position P2 to the first position P1. At this time, since an elastic force from the elastic member 80 is applied to the movable part 60, when the operator releases his/her hand from the movable part 60, the movable part 60 is automatically returned from the second position P2 to the first position P1.

As described above, when the connecting part 70 is caused to pass through an inside of the connected part C3, the connection mechanism 20 is connected to the trailer T. In the connected state, the connected part C3 is positioned between the base 21 and the movable part 60 in the vertical direction Z. In the present embodiment, a thickness of the connected part C3 is substantially the same as a vertical distance between the movable part 60 and the base 21.

After the trailer T is connected, the automated guided vehicle 10 moves to a registered destination. Since the connected part C3 is caught by the connecting part 70, the trailer T is towed and moved by the automated guided vehicle 10. At this time, in the connected state, the end portion on the upper side of the connecting part 70 penetrates the movable part 60 in the vertical direction Z and protrudes upward with respect to the lower surface of the movable part 60. Therefore, the connected part C3 can be inhibited from coming out of the connecting part 70. Accordingly, the connected state of the automated guided vehicle 10 with the trailer T can be inhibited from being released during movement to a destination.

Also, in the present embodiment, when the connecting part 70 is in the first state S1 and the movable part 60 is positioned at the first position P1, the end portion on the upper side of the connecting part 70 protrudes upward with respect to the movable part 60 via the through hole 63. Therefore, in the connected state, the connected part C3 is further inhibited from coming out of the connecting part 70. Accordingly, the connected state of the automated guided vehicle 10 with the trailer T is further inhibited from being released during movement to a destination.

Further, a force is applied to the movable part 60 in a direction that causes a position of the movable part 60 to be maintained at the first position P1. Thus, the movable part 60 is inhibited from shifting to the second position P2 during movement of the automated guided vehicle 10. Thereby, the connected part C3 can be further inhibited from being detached from the connecting part 70. In the present embodiment, by providing the elastic member 80, an elastic force can be applied to the movable part 60 in a direction from the second position P2 toward the first position P1. Thereby, the movable part 60 can be suitably maintained at the first position P1. Accordingly, the connected part C3 can be further inhibited from being detached from the connecting part 70.

As illustrated in FIG. 6, when arriving at a registered destination, the automated guided vehicle 10 switches the state of the connecting part 70 from the first state S1 to the second state S2. Thereby, the connecting part 70 is in a state in which it has come out of the connection hole C3a, and the connected state of the connection mechanism 20 of the trailer T is released. In this state, when the automated guided vehicle 10 moves to the front side, the connecting bar C comes out to the rear side from between the movable part 60 and the base 21, and the trailer T is left at the position. Thereby, the automated guided vehicle 10 can move the trailer T to the registered destination. Thereafter, the automated guided vehicle 10 returns a state of the connecting part 70 from the second state S2 to the first state S1 and goes back to the operator.

As described above, according to the present embodiment, the movable part 60 is movable between the first position P1 and the second position P2. Therefore, the operator can connect the trailer T to the automated guided vehicle 10 by manually moving the movable part 60 to the second position P2 and causing the connected part C3 to be caught by the connecting part 70. Thereby, the operator can easily connect the trailer T to the automated guided vehicle 10 without sending a command to switch a state of the connection mechanism 20 to the automated guided vehicle 10. On the other hand, after the trailer T is connected to the automated guided vehicle 10, the automated guided vehicle 10 automatically moves to a destination and releases the connection with the trailer T. Therefore, the trailer T can be automatically moved to a destination by the automated guided vehicle 10. As described above, according to the present embodiment, the operator can manually connect the trailer T with ease, and the automated guided vehicle 10 can automatically perform movement of the trailer T and release of the connection with the trailer T.

Also, according to the present embodiment, the end portion on a side opposite to the support part 40 in the movable part 60 is the bent part 62 bent upward. Therefore, the operator can easily rotate the movable part 60 by pinching the bent part 62. Further, as illustrated in FIG. 5, even when the thickness of the connected part C3 is substantially the same as the vertical distance between the movable part 60 and the base 21 in a connected state, a clearance can be made between the bent part 62 and the connected part C3 in the vertical direction Z. Thereby, even when the trailer T is in a state of being connected, the movable part 60 can be easily pinched using the bent part 62, and the movable part 60 can be easily shifted to the second position P2. Accordingly, the trailer T once connected can be manually detached from the automated guided vehicle 10 with ease.

Further, according to the present embodiment, in the second state S2, the entire connecting part 70 is accommodated in the hole 24c. Therefore, when the automated guided vehicle 10 moves to the front side after the automated guided vehicle 10 releases the connection with the trailer T at the destination, the connected part C3 does not easily caught by the connecting part 70. Thereby, the trainer T can be suitably placed at the destination by the automated guided vehicle 10.

Further, according to the present embodiment, the predetermined direction in which the movable part 60 is movable is the rotational direction around the rotating shaft 51. Therefore, by rotating the movable part 60 around the rotating shaft 51, the movable part 60 can be moved from the first position P1 to the second position P2, and this is simple.

Also, when the automated guided vehicle 10 arrives at the destination, depending on a posture of the automated guided vehicle 10 and a posture of the trailer T, there are cases in which a force is applied to the connecting part 70 from the connected part C3 toward the rear side. In this case, when mass of the trailer T and mass of loads placed on the trailer T are relatively large, a relatively large force is applied to the connecting part 70. Therefore, there are cases in which the drive unit 30 cannot easily move the connecting part 70 in the vertical direction Z.

In contrast, according to the present embodiment, the drive unit 30 moves the drive shaft 32 with a mechanism using a ball screw. Therefore, an output of the drive unit 30 can be made relatively large. Thereby, even when a relatively large force is applied to the connecting part 70, the connecting part 70 can be easily moved and the connection with the trailer T can be easily released.

The disclosure is not limited to the above-described embodiment, and other configurations may also be employed. In the above-described embodiment, a case in which the end portion on the upper side of the connecting part penetrates the movable part when the connecting part is in the first state S1 and the movable part is positioned at the first position P1 has been described, but the disclosure is not limited to thereto. In the case in which the connecting part is in the first state S1 and the movable part is positioned at the first position P1, the end portion on the upper side of the connecting part may come into contact with a lower surface of the movable part. In this case, the movable part may not have a through hole.

When the connecting part penetrates the movable part, the end portion on the upper side of the connecting part may need only be positioned higher than the lower surface of the movable part and may not protrude upward with respect to the movable part. In this case, the end portion on the upper side of the connecting part is positioned inside the through hole of the movable part. When the connecting part is in the second state S2, the connecting part may need only be disposed on a lower side than the position in the first state S1 and spaced apart from the movable part in the vertical direction Z, and a portion of the connecting part may protrude from the hole. The hole may be a hole having a bottom portion.

The predetermined direction in which the movable part is movable is not particularly limited. The predetermined direction may be a direction perpendicular to the vertical direction Z or may be a direction parallel to the vertical direction Z. When the movable part is movable in the vertical direction Z, the first position P1 may be on a lower side of the second position P2. In this case, a force can be applied to the movable part in a direction that causes a position of the movable part to be maintained at the first position P1 by using gravity. The movable part may not have a bent part.

An object moved by the automated guided vehicle of the above-described embodiment is not particularly limited as long as it has an annular connected part. The object may be an object without wheels. The Automated guided vehicle may be used indoors.

Each of the above-described configurations can be appropriately combined within a range not inconsistent with each other.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An automated guided vehicle which moves an object having an annular connected part, the automated guided vehicle comprising:
   a vehicle body:
   a drive wheel attached to the vehicle body: and
   a connection mechanism connected to the object via the connected part, wherein
   the connection mechanism comprises:
   a base having a hole recessed toward one side in a first direction;
   a connecting part extending in the first direction and having at least a portion thereof disposed in the hole;
   a drive unit moving the connecting part in the first direction;
   a support part protruding from a position different from the hole on the base toward another side in the first direction; and
   a movable part attached to be movable in a predetermined direction with respect to the support part, and is connected to the object when the connecting part is passed through an inside of the connected part, wherein
   the drive unit is able to switch a state of the connecting part between a first state in which an end portion of the connecting part protrudes from the hole toward the another side in the first direction and a second state in which the end portion of the connecting part is positioned on one side in the first direction with respect to that in the first state,
   the movable part is movable between a first position and a second position different from the first position,
   when the connecting part is in the first state and the movable part is positioned at the first position, the end portion of the connecting part comes into contact with a surface on one side in the first direction of the movable part or penetrates the movable part in the first direction to protrude toward the another side in the first direction with respect to the surface on one side in the first direction of the movable part,
   when the connecting part is in the first state and the movable part is positioned at the second position, the movable part is positioned at a position away from the connecting part in the predetermined direction,
   when the connecting part is in the second state, the connecting part and the movable part are disposed away from each other in the first direction, and
   a force is applied to the movable part in a direction that causes a position of the movable part to be maintained at the first position.

2. The automated guided vehicle according to claim 1, wherein
   the movable part comprises a through hole penetrating the movable part in the first direction, and
   when the connecting part is in the first state and the movable part is positioned at the first position, the end portion of the connecting part protrudes toward the another side in the first direction with respect to the movable part via the through hole.

3. The automated guided vehicle according to claim 2, wherein an end portion of the movable part on a side opposite to the support part is bent toward the another side in the first direction.

4. The automated guided vehicle according to claim 3, wherein the entire connecting part is accommodated in the hole in the second state.

5. The automated guided vehicle according to claim 4, wherein the connection mechanism comprises an elastic member that applies an elastic force to the movable part in the predetermined direction from the second position toward the first position.

6. The automated guided vehicle according to claim 5, wherein
   the connection mechanism comprises a hinge part having a rotating shaft extending a second direction perpendicular to the first direction,
   the movable part is attached to the support part with the hinge part,
   the predetermined direction is a rotational direction around the rotating shaft, and
   the elastic member is a coil spring attached to the rotating shaft.

7. The automated guided vehicle according to claim 3, wherein the connection mechanism comprises an elastic member that applies an elastic force to the movable part in the predetermined direction from the second position toward the first position.

8. The automated guided vehicle according to claim 7, wherein
   the connection mechanism comprises a hinge part having a rotating shaft extending in a second direction perpendicular to the first direction,
   the movable part is attached to the support part with the hinge part,
   the predetermined direction is a rotational direction around the rotating shaft, and
   the elastic member is a coil spring attached to the rotating shaft.

9. The automated guided vehicle according to claim 2, wherein the entire connecting part is accommodated in the hole in the second state.

10. The automated guided vehicle according to claim 9, wherein the connection mechanism comprises an elastic member that applies an elastic force to the movable part in the predetermined direction from the second position toward the first position.

11. The automated guided vehicle according to claim 10, wherein
    the connection mechanism comprises a hinge part having a rotating shaft extending in a second direction perpendicular to the first direction,
    the movable part is attached to the support part with the hinge part,
    the predetermined direction is a rotational direction around the rotating shaft, and
    the elastic member is a coil spring attached to the rotating shaft.

12. The automated guided vehicle according to claim 2, wherein the connection mechanism comprises an elastic member that applies an elastic force to the movable part in the predetermined direction from the second position toward the first position.

13. The automated guided vehicle according to claim 12, wherein
    the connection mechanism comprises a hinge part having a rotating shaft extending in a second direction perpendicular to the first direction,
    the movable part is attached to the support part with the hinge part, the predetermined direction is a rotational direction around the rotating shaft, and the elastic member is a coil spring attached to the rotating shaft.

14. The automated guided vehicle according to claim 1, wherein an end portion of the movable part on a side opposite to the support part is bent toward the another side in the first direction.

15. The automated guided vehicle according to claim 14, wherein the entire connecting part is accommodated in the hole in the second state.

16. The automated guided vehicle according to claim 15, wherein the connection mechanism comprises an elastic member that applies an elastic force to the movable part in the predetermined direction from the second position toward the first position.

17. The automated guided vehicle according to claim 16, wherein the connection mechanism comprises a hinge part having a rotating shaft extending in a second direction perpendicular to the first direction, the movable part is attached to the support part with the hinge part, the predetermined direction is a rotational direction around the rotating shaft, and the elastic member is a coil spring attached to the rotating shaft.

18. The automated guided vehicle according to claim 1, wherein the entire connecting part is accommodated in the hole in the second state.

19. The automated guided vehicle according to claim 1, wherein the connection mechanism comprises an elastic member that applies an elastic force to the movable part in the predetermined direction from the second position toward the first position.

20. The automated guided vehicle according to claim 19, wherein the connection mechanism comprises a hinge part having a rotating shaft extending in a second direction perpendicular to the first direction, the movable part is attached to the support part with the hinge part, the predetermined direction is a rotational direction around the rotating shaft, and the elastic member is a coil spring attached to the rotating shaft.

* * * * *